United States Patent
Ichimura et al.

(10) Patent No.: US 7,126,899 B2
(45) Date of Patent: Oct. 24, 2006

(54) OPTICAL RECORDING MEDIUM PROCESSING DEVICE AND FOCAL POINT CONTROL METHOD THEREOF

(75) Inventors: Isao Ichimura, Tokyo (JP); Tsutomu Maruyama, Chiba (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 10/505,047

(22) PCT Filed: Dec. 26, 2003

(86) PCT No.: PCT/JP03/16958

§ 371 (c)(1),
(2), (4) Date: Aug. 18, 2004

(87) PCT Pub. No.: WO2004/061834

PCT Pub. Date: Jul. 22, 2004

(65) Prior Publication Data

US 2005/0157614 A1    Jul. 21, 2005

(30) Foreign Application Priority Data

Jan. 7, 2003    (JP) .......................... 2003-000786

(51) Int. Cl.
*G11B 7/00* (2006.01)
(52) U.S. Cl. .................. 369/94; 369/44.25; 369/44.26
(58) Field of Classification Search ............ 369/112.1, 369/112.01, 53.22, 94, 44.25, 44.26, 112.02, 369/112.08, 112.23, 44.11, 44.35, 44.36
See application file for complete search history.

(56) References Cited

U.S. PATENT DOCUMENTS 6,480,444 B1 * 11/2002 Tada et al. ............... 369/44.27
6,584,048 B1 * 6/2003 Tateishi et al. ........... 369/44.28
6,777,657 B1 * 8/2004 Nishio et al. ............ 250/201.5

FOREIGN PATENT DOCUMENTS

| JP | 5-109085 | 4/1993 |
| JP | 2002-157750 | 5/2002 |

* cited by examiner

*Primary Examiner*—Nabil Hindi
(74) *Attorney, Agent, or Firm*—Oblon, Spivak, McClelland, Maier & Neustadt, P.C.

(57) ABSTRACT

The focus is moved from a first layer (L0) to a second layer (L1) of a double-layered optical disk by stopping a control loop operation and applying acceleration pulses for an interlayer jump to a two-axis electromagnetic actuator. Here, switching timing between acceleration and deceleration for an interlayer jump is generated based on the rate of change of a SUM signal obtained from a light-sensitive element (27), the SUM signal is distinguished by a specific threshold TH, and an S-shaped error signal is distinguished by thresholds THH and THL with different positive/negative level, thereby performing a pull-in operation of focus control. In addition, at the time of the interlayer jump, a liquid crystal element (23) for correcting the spherical aberration is optimized in advance for the cover layer thickness of the target layer L1.

1 Claim, 7 Drawing Sheets

FE = (A+C) − (B+D)

OPTICAL RECORDING MEDIUM PROCESSING DEVICE AND FOCAL POINT CONTROL METHOD THEREOF

TECHNICAL FIELD

The present invention relates to an optical recording medium handling device and a focus controlling method for the same, the device performing data recording/playback to/from a recording medium such as an optical disk.

BACKGROUND ART

Hitherto, in optical recording medium handling devices typified by an optical disk recorder/player, the diameter ($\phi$) of a focal spot is generally given according to formula (1):

$$\phi = \lambda/NA \quad (1)$$

where $\lambda$ is the wavelength and NA is the numerical aperture of the objective lens.

Therefore, the shorter the wavelength of the light source and the larger the numerical aperture of the objective lens, the smaller the diameter of the focal spot on the recording medium and the higher the possible density of optical recording.

A focusing objective lens used for an optical data recording/playback device is designed generally so that the residual wavefront aberration is minimized for a cover layer (transparent protective layer) which is provided as a protective film on a data-recording layer of a recording medium and which has a specific thickness. For example, a focusing objective lens is designed so as to be the optimum for a cover layer thickness of 1.2 mm in a CD (compact disk) device, and 0.6 mm in a DVD (digital versatile disk) device.

There is provided an optical disk (so-called multi-layer disk) in which a plurality of data-recording layers are laminated. In this multi-layer disk, each data-recording layer is covered by a cover layer, the cover layers having different thicknesses from each other.

In a DVD playback device that plays back a DVD having two data-recording layers, the numerical aperture of an objective lens is 0.6, and a red semiconductor laser with a wavelength of 650 nm is used as a light source.

The tolerance of the objective lens to a difference in thickness between the cover layers are given according to formula (2):

$$W_{40} = \frac{\Delta t (n^2 - 1) NA^4}{8 n^3} \quad (2)$$

where $\Delta t$ is the difference in thickness between the cover layers, and n is the refractive index of the cover layers (see, for example, S. Kubota, "Aplanatic condition required to reproduce jitter-free signals in optical disk system", Appl. Opt. Vol. 26, pp. 3961–3973 (1987) (hereinafter referred to as the Kubota paper)).

For example, when the permissible spherical aberration ($W_{40}$) is $\lambda/4$, the permissible fluctuation value ($\Delta t$) of the cover layer thickness in the above DVD playback device is ±27 μm. As for the double-layered disk used in the DVD playback device, the distance between data-recording layers is restricted to about 40 μm so as to fall in the above tolerance.

Recently, there has been disclosed a technique in which a high-capacity optical disc recording/playback device is achieved by shortening the wavelength of the light source and increasing the numerical aperture of the objective lens.

In this technique, a blue-violet semiconductor laser and an objective lens with a numerical aperture of 0.85 are used, and a recording capacity over 23 gigabytes is achieved in a DVD-size optical disk. On the other hand, according to formula (2), the accuracy of the cover layer thickness needs to be within ±4 μm.

However, if the same double-layered disk as in the DVD device is used in an optical disk recording/playback device using a high numerical aperture lens, in order to prevent interlayer interference of data signals, it is necessary to secure an interlayer distance of about 20 μm, which does not fall within the tolerance (±4 μm) for the cover layer thickness.

In order to deal with different cover layer thicknesses, there is disclosed a technique in which the spherical aberration is corrected by an expander lens (see, for example, Japanese Unexamined Patent Application Publication No. 2000-131603).

In addition, a more effective technique using a liquid crystal element is disclosed (see, for example, Japanese Unexamined Patent Application Publication No. 10-020263 and Japanese Unexamined Patent Application Publication No. 2001-331963). The liquid crystal element has, for example, a concentric electrode pattern, and, according to the voltage applied to electrodes, it can generate a wavefront substantially equivalent to the degree of correction of the spherical aberration caused by the thickness error of the cover layers (see, for example, M. Iwasaki, M. Ogasawara, and S. Ohtaki, "A new liquid crystal panel for spherical aberration compensation", Tech. Digest of Optical Data Storage Topical Meeting, SPIE 4342, pp. 103–105 (2001) (hereinafter referred to as the Iwasaki paper)).

When an objective lens with high numerical aperture is applied to recording and playback of a multi-layer disk medium, it is necessary to use a technique in which the focal point of the focal spot is selectively moved and controlled with respect to the target data-recording layer in addition to the above-described correcting technique.

There is disclosed a technique in which the above correcting unit is optimized in advance for the target data-recording layer when the pull-in operation of focus control and the focus movement are performed (see, for example, Japanese Unexamined Patent Application Publication No. 2002-100061). In addition to the optimizing technique of the above correcting unit, there is disclosed the application timing of acceleration pulses necessary for the focus movement (see, for example, Japanese Unexamined Patent Application Publication No. 2002-157750).

In an actual multi-layer optical recording medium, there is a possibility that a manufacturing error concerning the cover layer thickness occurs. Additionally, in the above-described correcting unit itself, there is a deviation of the degree of correction made to the applied voltage. Therefore, after completing the focus control pull-in operation, there needs to be a fine-tuning so that the degree of spherical aberration correction is optimal.

In particular, there are disclosed: a technique in which a playback signal from a data-recording medium is tuned to the optimal signal by using the jitter value represented as a fluctuation of the data edges with respect to a playback clock (normally, a PLL Clock: Phase-Locked Loop Clock), the signal amplitude, or the error rate (see, for example, K. Osato, I. Ichimura, F. Maeda, K. Yamamoto, and Y. Kasami, "Progress in optical disk recording with over 20 GB of capacity", Tech. Digest of Optical Data Storage Topical Meeting, Whistler, pp. 15–17 (2000) (hereinafter referred to as the Osato paper)); and a technique in which there is provided an automatic correcting mechanism based on a spherical aberration error signal generated from the return light intensity from a data-recording medium (see, for example, T. Shimano, M. Umeda, and T. Ariyoshi, "Spherical aberration detection in the optical pickups for high-density digital versatile discs", Jpn. J. Appl. Phys. 40, pp. 2292–2295 (2001) (hereinafter referred to as the Shimano paper)).

On the other hand, the wavefront aberration $W_{20}$ caused by a focus error ($\Delta z$) is proportional to the square of the numerical aperture of a lens, and described according to formula (3):

$$W_{20} = \frac{1}{2}\Delta z NA^2 \qquad (3)$$

However, in a multi-layer optical disk device using the above-described high numerical aperture objective lens, since the focal depth of the focusing objective lens is generally shallow, a focus control error signal is discontinuous between data-recording layers. Therefore, there exists a problem in that it is difficult to determine the switching timing between acceleration and deceleration.

Therefore, in comparison with, for example, a known double-layered DVD device, interlayer movement of a light spot cannot be achieved easily.

It is an object of the present invention to provide an optical recording medium handling device and a focus controlling method for the same that can perform interlayer movement from one data-recording layer to another data-recording layer appropriately and easily with respect to a recording medium having a plurality of data-recording layers.

DISCLOSURE OF INVENTION

In order to achieve this object, the present invention includes an objective lens unit focusing a spot of light onto an optical data-recording medium having a plurality of data-recording layers; a driving unit moving the objective lens unit in the direction of the optical axis to move the focal point of the spot of light between the plurality of data-recording layers; a spherical aberration correcting unit correcting the spherical aberration occurring in transparent cover layers provided for each data-recording layer and having different thicknesses; a reflected-light detecting unit detecting the spot of light reflected by the optical data-recording medium; and a control unit switching between acceleration and deceleration of the driving unit based on the rate of change of a reflected-light intensity signal detected by the reflected-light detecting unit, when an interlayer movement is performed, the interlayer movement being the movement of the focal point of the spot of light from one data-recording layer to another data-recording layer.

Furthermore, the present invention provides a focus controlling method for an optical recording medium handling device, the device comprising an objective lens unit focusing a spot of light onto an optical data-recording medium having a plurality of data-recording layers, a driving unit moving the objective lens unit in the direction of the optical axis to move the focal point of the spot of light between the plurality of data-recording layers, a spherical aberration correcting unit correcting the spherical aberration occurring in transparent cover layers provided for each data-recording layer and having different thicknesses, and a reflected-light detecting unit detecting the spot of light reflected by the optical data-recording medium; the method comprising the step of switching between acceleration and deceleration of the driving unit based on the rate of change of a reflected-light intensity signal detected by the reflected-light detecting unit, when an interlayer movement is performed, the interlayer movement being the movement of the focal point of the spot of light from one data-recording layer to another data-recording layer.

In the optical recording medium handling device and the focus controlling method for the same according to the present invention, switching between acceleration and deceleration is performed based on the rate of change of a reflected-light intensity signal from the optical recording medium when an interlayer movement is performed between a plurality of data-recording layers. Therefore, even if the focus control error signal is discontinuous between data-recording layers, acceleration and deceleration of the driving unit can be controlled appropriately and the interlayer movement can be achieved appropriately and easily.

It is effective especially in the case where playback and recording of an optical data-recording medium are performed with an objective lens with high numerical aperture. In addition, in combination with preset value control of the cover layer thickness in the spherical aberration correcting unit, it is possible to achieve a reliable focus switching operation.

BEST MODE FOR CARRYING OUT THE INVENTION

The preferred embodiments of the optical recording medium handling device and the focus controlling method for the same according to the present invention will now be described with reference to the drawings.

In this embodiment, when an interlayer movement (interlayer jump) from one data-recording layer to another data-recording layer of a multi-layer disk is performed, switching between acceleration and deceleration of a driving unit is performed based on the rate of change of a reflected-light intensity signal generated by a light intensity detecting element, thereby achieving an appropriate operation.

Here, as an example, there will be described a technique for performing focus control and an interlayer jump of a light spot with respect to a double-layered disk in an optical disk playback device using a two-group objective lens with a numerical aperture of 0.85 and a blue-violet semiconductor laser with a wavelength of 405 nm.

Figure 1:
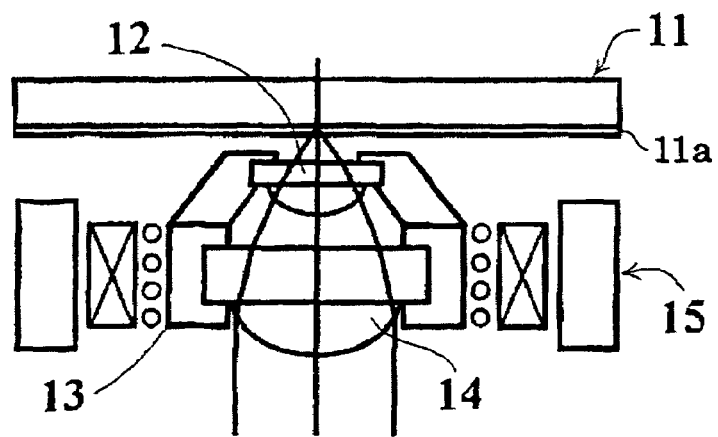
FIG. 1 is a sectional view showing an example configuration of an objective lens unit of an optical disk playback device in an embodiment of the present invention.

FIG. 1 is a sectional view showing an example configuration of an objective lens unit of an optical disk playback device in this embodiment.

The two-group objective lens consists of a first lens 12 and a second lens 14.

The second lens 14 is mounted on a two-axis electromagnetic actuator 15 having a structure capable of moving along the optical axis and in the direction perpendicular to the signal track. The first lens 12 is held by a lens holder 13 so as to be located on the same optical axis as the second lens 14. These two lenses function as a two-group objective lens with a numerical aperture of 0.85.

A beam from a semiconductor laser light source (not shown in FIG. 1) passes through these two lenses 12 and 14, thereby being focused on an optical disk medium 11. Since high numerical aperture is achieved, the operating distance of the objective lens is small in comparison with a hitherto known optical pickup. In this embodiment, the value is about 140 μm.

The increase in numerical aperture of the objective lens generally reduces the disk tilt tolerance in an optical disk device. When the tilting angle of the disk with respect to the optical axis is θ, the generated comatic aberration ($W_{31}$) is given by formula (4) according to the Kubota paper:

$$W_{31} = \frac{t(n^2-1)n^2 \sin\theta\cos\theta \cdot NA^3}{2(n^2-\sin^2\theta)^{5/2}} \quad (4)$$

and it is generally proportional to the cube of the NA and the thickness t of the cover layer of the disk medium 11.

Therefore, when the value of permissible spherical aberration ($W_{31}$) is λ/4, in order to secure the same disk tilt tolerance in an optical disk device with a numerical aperture increased to 0.85 as in a DVD playback device, it is necessary to reduce the cover layer thickness to about 0.1 mm. FIG. 1 schematically shows a case where a cover layer 11a (0.1 t Cover) with a thickness of 0.1 mm is provided.

Figure 2:
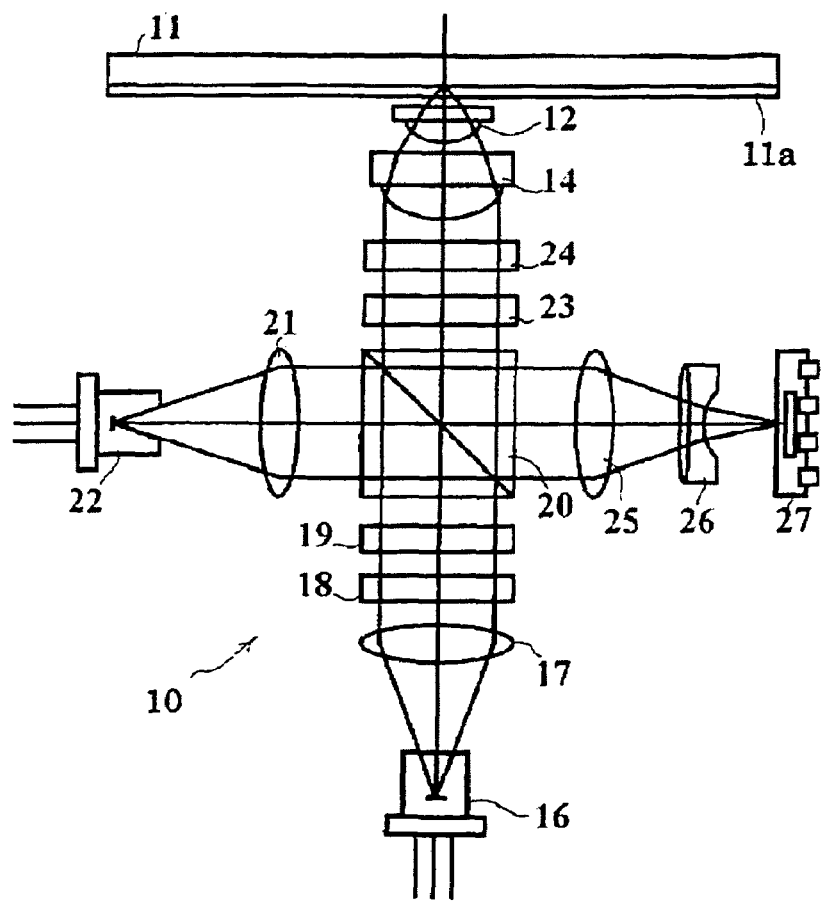
FIG. 2 is a sectional view showing an example configuration of an optical pickup of an optical disk playback device in an embodiment of the present invention.

FIG. 2 is a sectional view showing an example configuration of an optical pickup 10 in this embodiment.

The output light from the semiconductor laser light source 16 is converted to a parallel beam by a collimator lens 17. The parallel beam passes through a diffraction grating 19, which is for generating side spots used for calculating a tracking control error signal, and then it is focused on the recording medium by the two-group objective lens formed of lenses 12 and 14. Part of the output light is reflected by a polarization beam splitter 20, and then it is led to a light-sensitive element 22 by a focusing lens 21, the light-sensitive element 22 being used for detecting emission output. This part of the light is used for the purpose of controlling the laser output at a steady value.

The quantity of light entering the light-sensitive element 22 can be controlled by rotating a ½-wave plate 18. The actual laser output is controlled at a desired emission output value by an automatic power control (APC) circuit (not shown).

Between the polarization beam splitter 20 and the two-group lens formed of lenses 12 and 14, a liquid crystal element 23 for correcting spherical aberration is provided.

Figure 3:
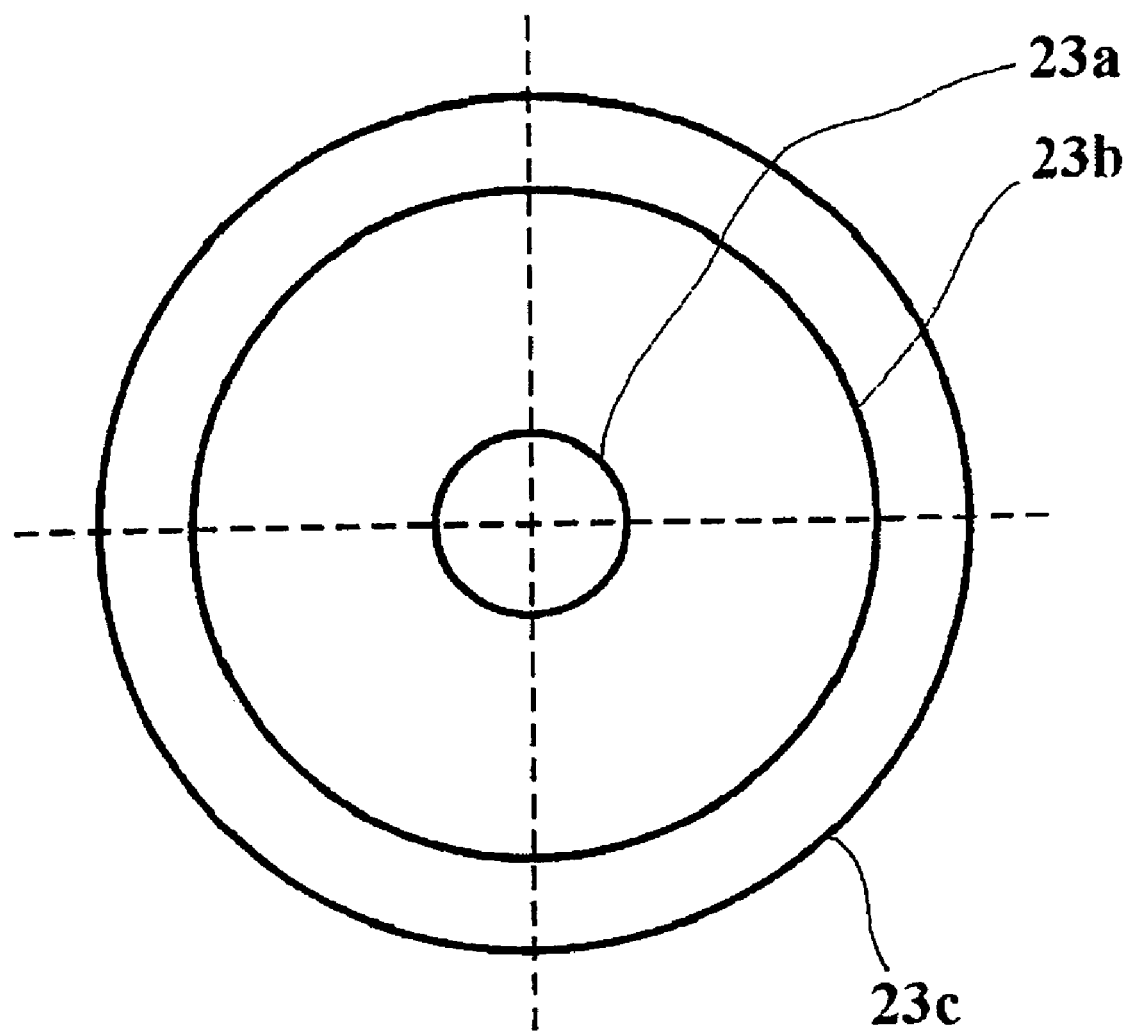
FIG. 3 is an explanatory view showing an example of an electrode pattern of a liquid crystal element used in an optical disk playback device in an embodiment of the present invention.

FIG. 3 is an explanatory view showing an example of an electrode pattern of the liquid crystal element 23 used in this embodiment.

As shown, the liquid crystal element 23 has concentric electrodes 23a, 23b, and 23c as disclosed in the above-described Iwasaki paper. The liquid crystal element 23 can generate a wavefront according to the voltages applied to the electrodes 23a, 23b, and 23c. The wavefront is substantially equivalent to the degree of correction of the spherical aberration caused by a thickness error of the cover layer of the optical disk medium 11.

Figure 4:
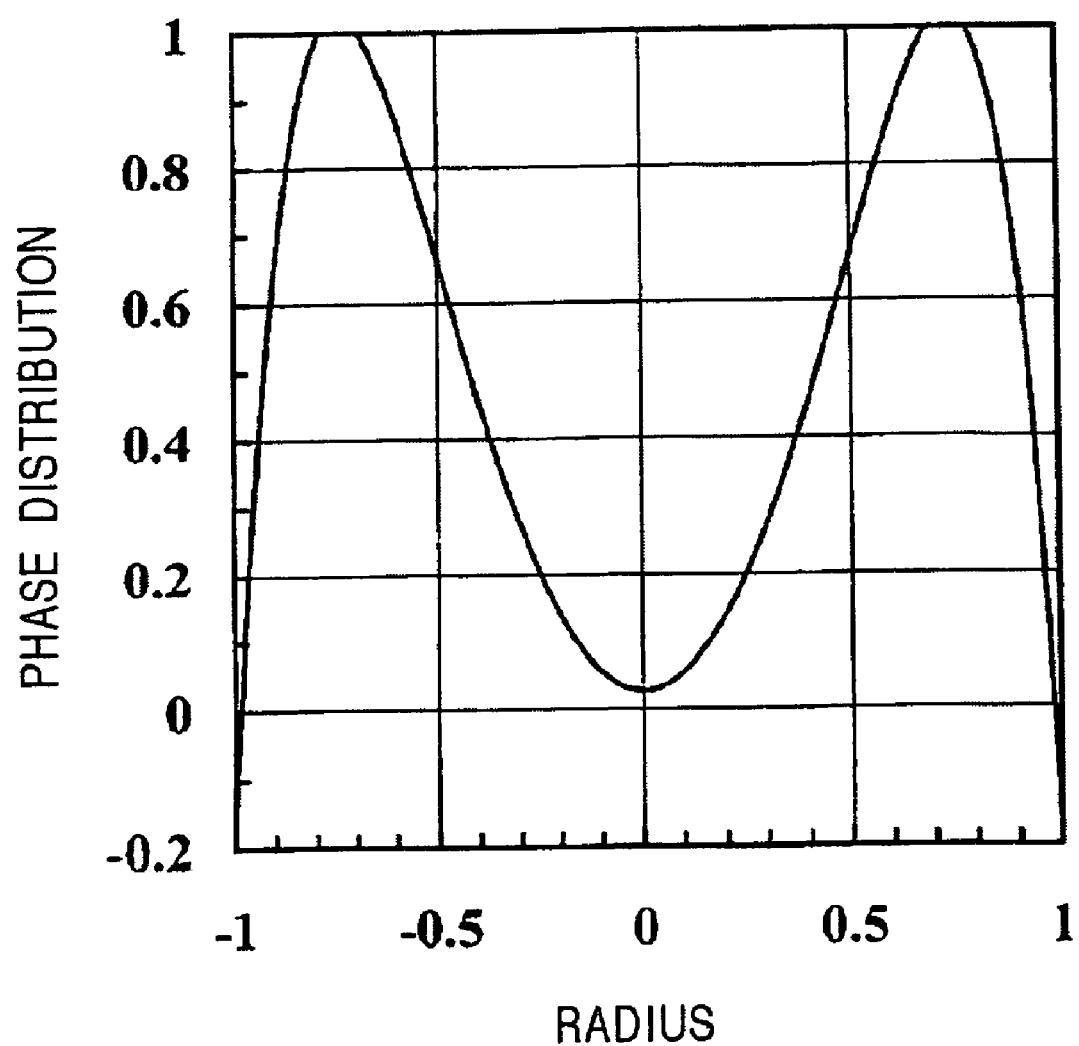
FIG. 4 is an explanatory view showing an example of a wavefront produced by the liquid crystal element shown in FIG. 3.

FIG. 4 is an explanatory view showing an example of a wavefront generated by the liquid crystal element 23 shown in FIG. 3. The horizontal axis shows radius and the vertical axis shows phase distribution.

In front of the two-group lens formed of lenses 12 and 14, a ¼-wave plate 24 is disposed. This is for converting a linear polarization of the semiconductor laser light source 16 to circularly polarized light.

On the other hand, the reflected light from the optical disk medium 11 is reflected by the polarization beam splitter 20, and then it is led to the detecting optical path.

In this embodiment, an astigmatism method is used as a focus control error signal, and a differential push-pull method is used as a tracking control error signal. The converging light passing through a focusing lens 25 and a complex lens 26 enters a light-sensitive element 27, and then it is converted photoelectrically. The light-sensitive element 27 is for detecting a signal functioning as both a servo error signal and an RF signal.

Figure 5:
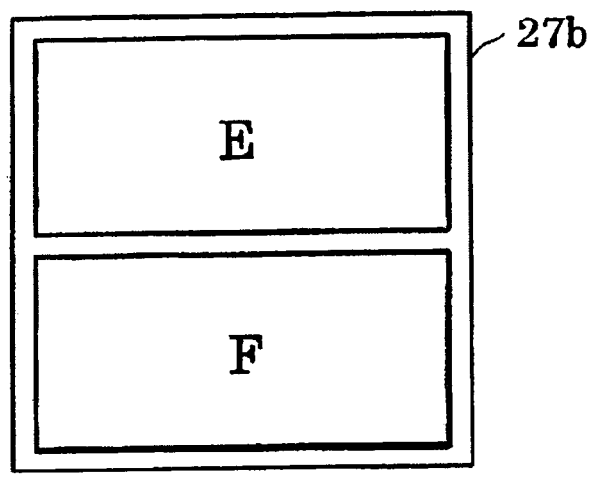
FIG. 5 is an explanatory view showing an example configuration of a light-sensitive element divided into areas and used in an optical disk playback device in an embodiment of the present invention.
Figure 5:
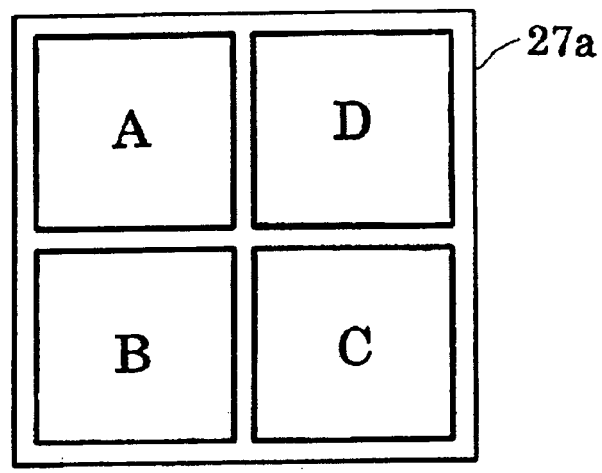
Figure 5:
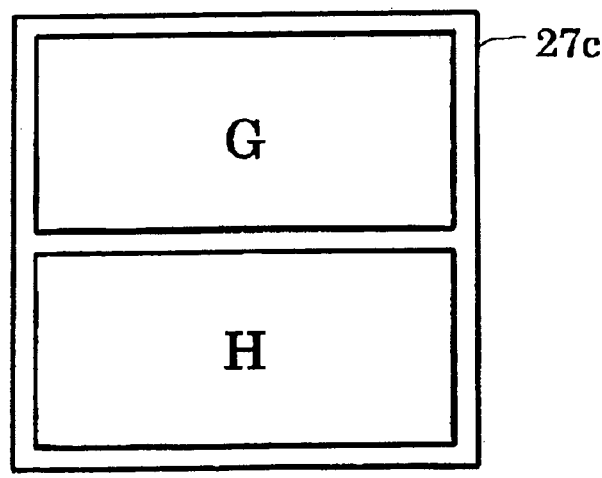

As shown in FIG. 5, the light-sensitive element 27 is a multi-element device having a first light-detecting element 27a, a second light-detecting element 27b, and a third light-detecting element 27c detecting the spot of light. The first light-detecting element 27a is located in the center and is divided into four areas. The second light-detecting element 27b and the third light-detecting element 27c are located on either side of the first light-detecting element 27a and each divided into two areas. Therefore, the light-sensitive element 27 has eight areas in total. Based on the outputs A to H from these areas, the focus control error signal (FE) and the tracking control error signal (TE) are calculated according to formulas (5) and (6), respectively:

$$FE=(A+C)-(B+D) \quad (5)$$

$$TE=(A+D)-(B+C)-k\{(E-F)+(G-H)\} \quad (6)$$

The RF signal and the SUM signal are given as the sum of the outputs A to D from the four areas of the first light-detecting element 27a according to formula (7):

$$RF(SUM)=A+B+C+D \quad (7)$$

The full band component of the signal output is used as the RF signal, and the low band component is used as the SUM signal.

Figure 6:
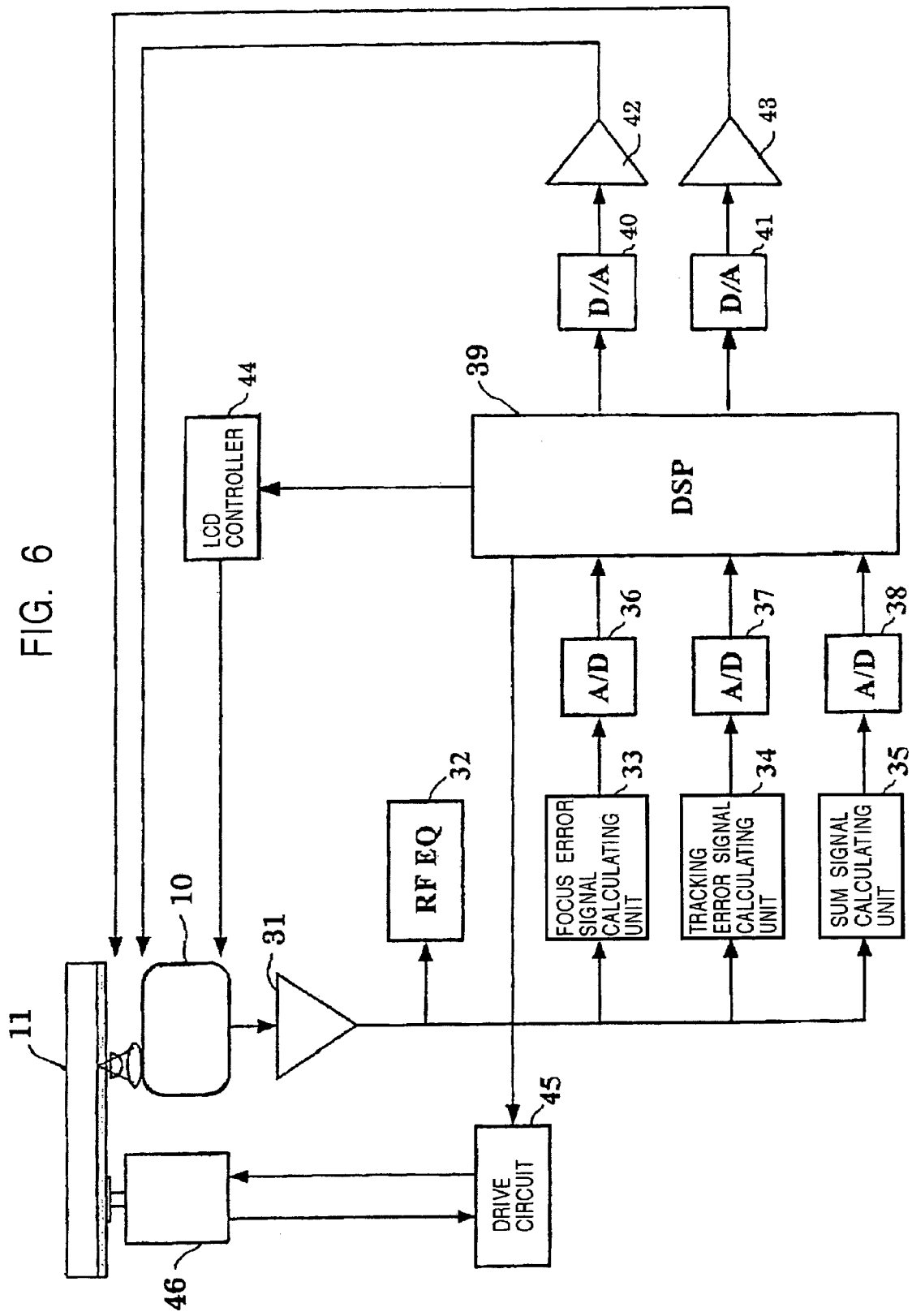
FIG. 6 is a block diagram showing the entire configuration of an example of an optical disk playback device in an embodiment of the present invention.

FIG. 6 is a block diagram showing an example configuration of an optical data recording/playback device in this embodiment.

First, the playback signal read out from the optical disk medium 11 by the optical pickup 10 is input into a head amplifier 31. The head amplifier 31 amplifies playback signals from the optical pickup 10 (outputs from the divided detecting element) up to a predetermined level necessary for processing in a later stage.

The waveform of the playback RF signal amplified here is equalized by an equalizer amplifier (RF EQ) 32, and then it is supplied to a signal processing system (not shown).

A DSP (Digital Signal Processor) 39 controls the operation of the entire optical disk device, i.e., a drive circuit 45 of a spindle motor 46, focusing of the optical system, and tracking.

A focus error signal calculating unit (Focusing Matrix) 33 performs calculation with respect to the input signal according to formula (5). A tracking error signal calculating unit (Tracking Matrix) 34 and a SUM signal calculating unit (SUM Matrix) 35 perform calculation according to formula (6) and formula (7), respectively.

The calculation outputs are converted into digital signals by A/D converters 36, 37, and 38. The DSP 39 performs gain control and phase compensation concerning the focus control and the tracking control. The outputs from the DSP 39 are converted into analog signals by D/A converters 40 and 41, amplified by amplifiers 42 and 43 up to the necessary signal amplitude, and used for driving a two-axis electromagnetic actuator 15 mounted on the optical pickup 10 in order to control lens position.

The LCD controller 44 controls the liquid crystal element 23 based on the control from the DSP 39, thereby correcting the spherical aberration.

Next, there will be described a controlling method in the case where an interlayer movement of a focal spot is performed with respect to a double-layered optical disk medium by using the optical pickup 10 of this embodiment. The double-layered optical disk medium has a cover layer with a thickness of 100 µm for a first data-recording layer (Layer 0; hereinafter referred to as L0), and another cover layer with a thickness of 75 µm for a second data-recording layer (Layer 1; hereinafter referred to as L1).

Here, the current position of the focal spot (that is to say, the focal point) is in the L0 layer, and the technique described in Japanese Unexamined Patent Application Publication No. 2002-100061 is used. That is to say, when the focus moves, the cover layer thickness used in the spherical aberration correcting unit is optimized in advance for the target layer L1.

Figure 7:
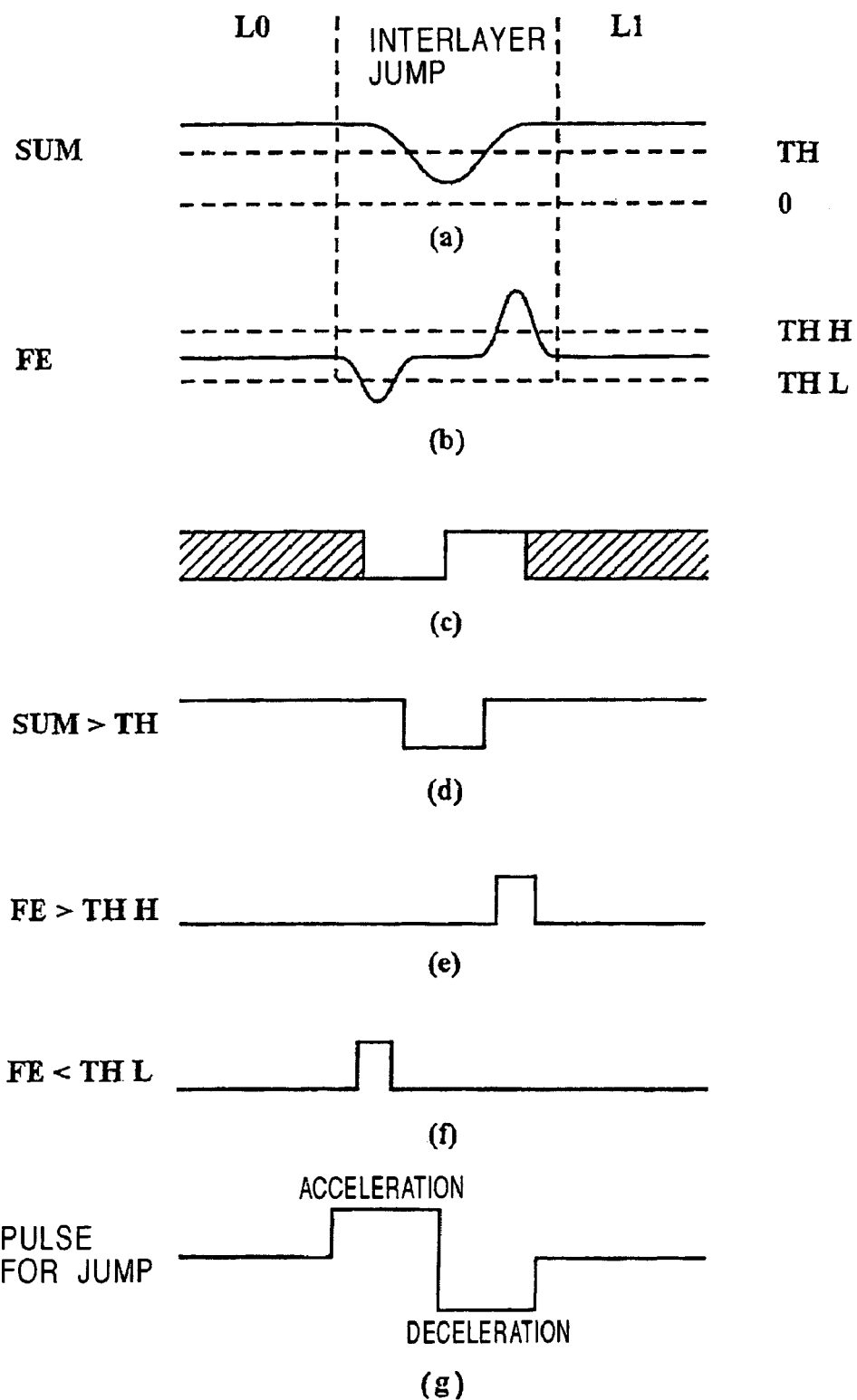
FIG. 7 is an explanatory view showing an example of an operating waveform of an optical disk playback device in an embodiment of the present invention.

FIG. 7 is an explanatory view showing signal waveforms in the operational examples described below. FIG. 7 shows the change of each signal waveform observed when the focus is moved from the L0 layer to the L1 layer of the double-layered optical disk by stopping the control loop operation and applying acceleration pulses for interlayer jumping to the two-axis electromagnetic actuator.

Figure 8:
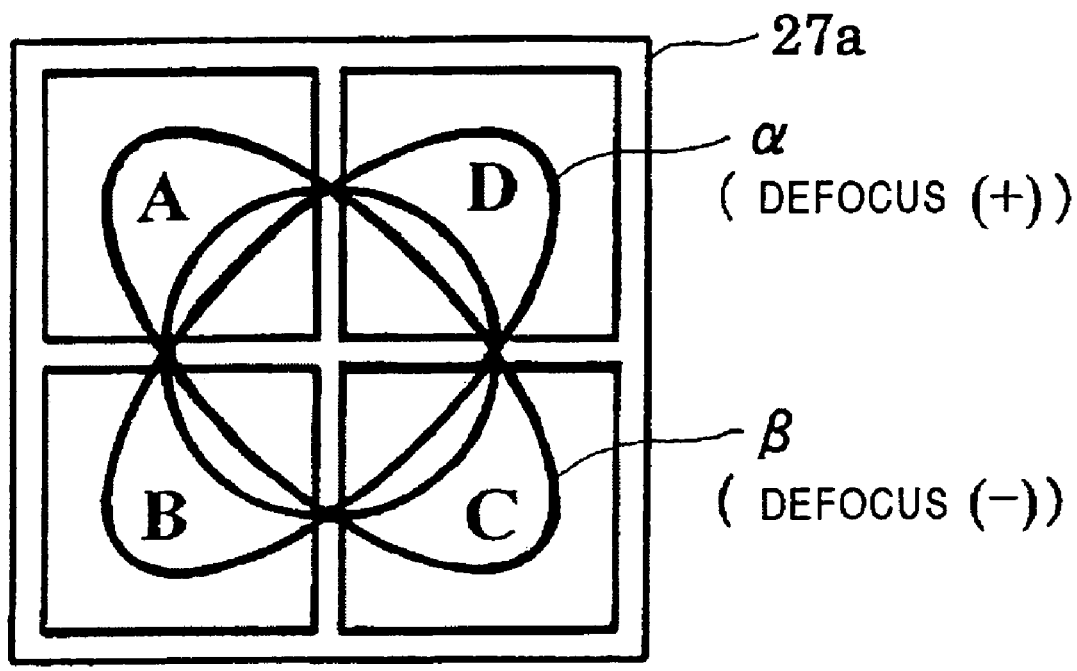
FIG. 8 is an explanatory view showing the light intensity distribution on the light-sensitive element according to the astigmatism method used in an optical disk playback device in an embodiment of the present invention.

First, FIG. 7($a$) shows the SUM signal, and FIG. 7($b$) shows the focus control error signal detected at the same time. Here, for example, as shown in FIG. 8, the astigmatism focus error signal shows a circular strength distribution when light is focused on the light-sensitive element 27 (the first light detecting element 27$a$) by the complex lens 26, and other than that, it shows an elliptical strength distribution (shown by ellipse α (Defocus (+)) and ellipse β (Defocus (−))). Therefore, the calculation result according to formula (4) generates an output that becomes zero level when light is focused (so-called S-shaped error signal).

The strength of the S-shaped error signal observed when the focal spot performs an interlayer movement changes in the sequence: (1) negative, (2) zero, (3) positive, and (4) zero, and the S-shaped error signal is not continuous. In addition, when the preset value of the spherical aberration correcting element is considerably different from the optimal value for the target recording layer, the focal spot on the recording medium is extremely deteriorated by the generated spherical aberration, and there is a possibility that an S-shaped error signal with the original signal amplitude cannot be obtained.

In this embodiment, the switching timing between acceleration and deceleration for an interlayer jump is generated based on the rate of change of the SUM signal, the SUM signal is distinguished by a specific threshold (TH shown in FIG. 7($a$)), and the S-shaped error signal is distinguished by thresholds (THH and THL shown in FIG. 7($b$)) with different positive/negative level, thereby performing a pull-in operation of focus control.

FIG. 7($c$) shows the change in strength (for example, differential coefficient) of the SUM signal detected by the DSP 39. On the diagram, the Low level corresponds to the negative differential coefficient, and the High level corresponds to the positive differential coefficient.

That is to say, since the SUM signal is the minimum when the focal spot passes through the intermediate position between the L0 layer and the L1 layer, it is possible to switch between acceleration pulse application and deceleration pulse application by using the changing point of the differential coefficient (FIG. 7($g$)).

FIG. 7($d$) shows a logic signal showing comparison between the SUM signal and the threshold. FIG. 7($e$) and FIG. 7($f$) each show a logic signal showing comparison between the focus control error signal and the threshold.

Therefore, after switching from an acceleration pulse to a deceleration pulse, when the S-shaped signal exceeds the threshold (THH) and becomes below the threshold (THH) again, the application of the deceleration pulse is stopped. When the SUM signal level is greater than or equal to a certain threshold (TH), the focus control loop is operated again.

In this way, an interlayer movement of a focal spot in a double-layered optical disk medium is easily achieved in an optical disk device using a high numerical aperture objective lens.

Although an embodiment of the present invention is described above, the present invention is not limited to the above embodiment.

Although there is described the case where the focal spot moves from the L0 layer to the L1 layer in the above embodiment, it goes without saying that an interlayer jump from the L1 layer to the L0 layer can be achieved by using the same technique. In this case, although the polarity of the observed focus control error signal is generally reversed, it is only necessary to change the threshold level in the above embodiment from THH to THL.

In the above embodiment, a technique in which the spherical aberration correcting unit is optimized in advance for the cover layer thickness of the target layer L1 is used. Therefore, since a focus error signal with regular strength is obtained at the destination of the focal spot, the operation timing of the control loop can be easily determined.

By a technique in which the preset value of the spherical aberration correcting unit is preset to an intermediate value between the cover layer thickness of the L0 layer and that of the L1 layer, there is also obtained a focus control error signal with a strength adequate for the pull-in operation determination. Therefore, such a control may be adopted. Although a liquid crystal element is used as an example of a spherical aberration correcting unit in the above embodiment, the above-described technique disclosed in Japanese Unexamined Patent Application Publication No. 2000-131603 using an expander lens is also effective.

As described above, in an actual multi-layer optical recording medium, there is a possibility that a manufacturing error concerning the cover layer thickness may occur. Additionally, in the correcting element itself, there is a deviation of the degree of correction made to the applied voltage. Therefore, after completing the focus control pull-in operation, there needs to be a fine-tuning so that the degree of spherical aberration correction is optimal.

According to the above-described technique disclosed in the Osato paper, a playback signal from a data-recording medium may be tuned so as to be optimal by using the jitter value represented as a fluctuation of the data edges with respect to a playback clock, the signal amplitude, or the error rate. Alternatively, according to the above-described technique disclosed in the Shimano paper, there may be provided an automatic correcting mechanism based on a spherical aberration error signal generated from the return light intensity from a data-recording medium.

Although a two-group objective lens having a high numerical aperture is used in the above embodiment, a single lens can also achieve the same function.

Although there is described a device handling an optical disk medium having two recording layers in the above embodiment, an interlayer movement of a focal spot can also be performed in a device handling an optical disk medium having three recording layers or more and a device handling an optical data-recording medium other than an optical disk medium by using the same technique.

In addition, the present invention can be widely applied to a playback-only device and a recording/playback device for an optical data-recording medium.

As described above, in the optical recording medium handling device and the focus controlling method for the same according to the present invention, switching between acceleration and deceleration is performed based on the rate of change of a reflected-light intensity signal from the optical recording medium when an interlayer movement is performed between a plurality of data-recording layers. Therefore, even if the focus control error signal is discontinuous between data-recording layers, acceleration and deceleration of the driving unit can be controlled appropriately and the interlayer movement can be achieved appropriately and easily.

It is effective especially in the case where playback and recording of an optical data-recording medium are performed with an objective lens with high numerical aperture. In addition, in combination with preset value control of the cover layer thickness in the spherical aberration correcting unit, it is possible to achieve a reliable focus switching operation.

The invention claimed is:

1. An optical recording medium handling device comprising:
    an objective lens unit focusing a spot of light onto an optical data-recording medium having a plurality of data-recording layers;
    a driving unit moving the objective lens unit in the direction of the optical axis to move the focal point of the spot of light between the plurality of data-recording layers;
    a spherical aberration correcting unit correcting the spherical aberration occurring in transparent cover layers provided for each data-recording layer and having different thicknesses;
    a reflected-light detecting unit detecting the spot of light reflected by the optical data-recording medium; and
    a control unit switching between acceleration and deceleration of the driving unit based on the rate of change of a reflected-light intensity signal detected by the reflected-light detecting unit, when an interlayer movement is performed, the interlayer movement being the movement of the focal point of the spot of light from one data-recording layer to another data-recording layer, wherein the objective lens unit includes a two-group objective lens with high numerical aperture.

* * * * *